(12) United States Patent
Child et al.

(10) Patent No.: US 12,017,577 B2
(45) Date of Patent: Jun. 25, 2024

(54) VEHICLES WITH AUTOMATIC HEADLIGHT ALIGNMENT

(71) Applicant: Apple Inc., Cupertino, CA (US)

(72) Inventors: Christopher P Child, San Jose, CA (US); Clarisse Mazuir, San Jose, CA (US); Kurt R Stiehl, Los Gatos, CA (US); Mark A Zurcher, Encinitas, CA (US); Mikael B Mannberg, San Jose, CA (US); Ryan J Garrone, San Francisco, CA (US); Xiaofeng Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/721,146

(22) Filed: Apr. 14, 2022

(65) Prior Publication Data

US 2023/0001847 A1 Jan. 5, 2023

Related U.S. Application Data

(60) Provisional application No. 63/298,365, filed on Jan. 11, 2022, provisional application No. 63/216,780, filed on Jun. 30, 2021.

(51) Int. Cl.
*B60Q 1/11* (2006.01)
*B60Q 1/00* (2006.01)
(Continued)

(52) U.S. Cl.
CPC .............. *B60Q 1/11* (2013.01); *B60Q 1/0023* (2013.01); *B60Q 1/10* (2013.01); *B60Q 1/115* (2013.01);
(Continued)

(58) Field of Classification Search
CPC .......... B60Q 2300/13; B60Q 2300/322; B60Q 2300/324; G01B 11/272; G01B 11/24
See application file for complete search history.

(56) References Cited

U.S. PATENT DOCUMENTS 5,193,894 A * 3/1993 Lietar ................. G01M 11/068
362/276
7,156,542 B2 1/2007 Miller et al.
(Continued)

FOREIGN PATENT DOCUMENTS

CN 108202741 A 6/2018
DE 19527349 A1 1/1997
(Continued)

OTHER PUBLICATIONS

Striegler, Arne, "Method For Checking The Adjustment Of A Headlight In A Motor Vehicle", Dec. 24, 2014, Machine English Translation document of DE 10 2013 211 876 A1, pp. 1-5. (Year: 2014).*

(Continued)

*Primary Examiner* — Alan B Cariaso
(74) *Attorney, Agent, or Firm* — Treyz Law Group, P.C.; Tianyi He (57) ABSTRACT

A vehicle may have lights such as headlights. The lights may be moved using a positioner. Control circuitry in the vehicle may use sensor circuitry to monitor the environment surrounding the vehicle. The sensor circuitry may include one or more sensors such as a lidar sensor, radar sensor, image sensor, and/or other sensors to measure the shape of a surface in front of the vehicle and the location of the surface relative to the vehicle. These sensors and/or other sensors in the sensor circuitry also measure headlight illumination on the surface. Based on the known shape of the surface in front of the vehicle and the distance of the surface from the vehicle, the control circuitry can predict where a headlight (Continued)

should be aimed on the surface. By comparing predictions of headlight illumination on the surface to measurements of headlight illumination on the surface, the vehicle can determine how to move the headlight with the positioner to align the headlight.

22 Claims, 7 Drawing Sheets (51) Int. Cl.
  *B60Q 1/10*    (2006.01)
  *B60Q 1/115*   (2006.01)
  *G01B 11/24*   (2006.01)
  *G01B 11/27*   (2006.01)
  *G01M 11/06*   (2006.01)
  *G01S 17/89*   (2020.01)
(52) U.S. Cl.
  CPC ......... *G01B 11/272* (2013.01); *G01M 11/064* (2013.01); *G01M 11/065* (2013.01); *G01M 11/068* (2013.01); *G01S 17/89* (2013.01); *B60Q 2300/13* (2013.01); *B60Q 2300/322* (2013.01); *B60Q 2300/324* (2013.01); *G01B 11/24* (2013.01)

(56) References Cited

U.S. PATENT DOCUMENTS

| 7,541,743 | B2 * | 6/2009 | Salmeen | G01S 13/931 |
| | | | | 315/77 |
| 10,262,217 | B2 | 4/2019 | Cohen et al. | |
| 2011/0080751 | A1 * | 4/2011 | Mochizuki | B60Q 1/076 |
| | | | | 362/530 |
| 2013/0279185 | A1 * | 10/2013 | Totzauer | B60Q 1/04 |
| | | | | 362/465 |
| 2014/0129081 | A1 * | 5/2014 | Ehlgen | B60Q 1/0023 |
| | | | | 701/36 |
| 2014/0217888 | A1 | 8/2014 | Hoffman | |
| 2016/0320181 | A1 * | 11/2016 | Foltin | G06V 20/56 |
| 2018/0001814 | A1 | 1/2018 | Salter et al. | |
| 2019/0160998 | A1 | 5/2019 | Naserian et al. | |
| 2020/0072428 | A1 | 3/2020 | Simchak et al. | |
| 2020/0101890 | A1 | 4/2020 | Solar et al. | |

FOREIGN PATENT DOCUMENTS

| DE | 102013201850 A1 * | 8/2014 | ............ B60Q 1/115 |
| DE | 102013211876 A1 | 12/2014 | |
| DE | 102016006391 A1 * | 11/2017 | |
| EP | 0949118 A2 * | 10/1999 | |
| EP | 2128590 A1 * | 12/2009 | ............ B60Q 1/085 |
| EP | 2128590 A1 | 12/2009 | |
| EP | 2871094 A1 | 5/2015 | |
| SE | 1350069 A1 * | 7/2014 | |
| WO | 2012048795 A1 | 4/2012 | |
| WO | 2014206624 A1 | 12/2014 | |

OTHER PUBLICATIONS

Staffen, Rene, "Method And Device For Calibrating A Horizontal Bright-dark Border Created By A Headlamp Of A Vehicle", Dec. 2, 2009, Merged English Translation Text with Image of EP 2 128 590 A1, pp. 1-4 plus merged text. (Year: 2009).*

Neukam, Johannes, "Environmentally Dependent Calibration Of A Projection, In Particular By Means Of A High-resolution Vehicle Headlight", Nov. 30, 2017, Merged English Translation Text with Image of DE 102016006391 A1, pp. 1-15 plus merged text (Year: 2017).*

R. Cochard et E. Lopez, "Direction Adjustment Device For Vehicle Headlight Beam", Oct. 13, 1999, Merged English Translation Text with Image of EP 0940118 A1, pp. 1-11 plus merged text. (Year: 1999).*

A. Elmelid and A. Dirhoussi, "Determination Of The Slope Of A Vehicle", Jul. 24, 2014, SE 1350069 A1, Image document with merged English machine translation. (Year: 2014).*

* cited by examiner

VEHICLES WITH AUTOMATIC HEADLIGHT ALIGNMENT

This application claims the benefit of provisional patent application No. 63/298,365, filed Jan. 11, 2022, and provisional patent application No. 63/216,780, filed Jun. 30, 2021, which are hereby incorporated by reference herein in their entireties.

FIELD

This relates generally to systems such as vehicles, and, more particularly, vehicles that have lights.

BACKGROUND

Automobiles and other vehicles have lights such as headlights. To accommodate different driving conditions, headlights are sometimes provided with adjustable settings such as low beam and high beam settings. Some headlights can be steered during operation to accommodate road curvature.

SUMMARY

A vehicle may have lights such as headlights. Sensor circuitry in the vehicle may be used to measure the shape and location of surfaces in front of the vehicle. The sensor circuitry can also be used to measure how the headlights illuminate the surfaces as light from the headlights is projected onto the surfaces. For example, the sensor circuitry may measure where the headlights are aimed on the surfaces and can measure the pattern of light from the headlights on the surface as the headlight illumination is projected onto the surface. Light intensity measurements from an image sensor or other sensor may be used to obtain a peak headlight intensity position, may be used to locate edges in an illumination pattern, and may be used to determine other illumination characteristics.

Information on the three-dimensional shape of a surface in front of the vehicle can be used to predict where the headlights should be aimed and therefore the pattern of illumination from the headlights on the surface when the headlights are aligned relative to the vehicle. By comparing a prediction of headlight illumination intensity on the surface to measured headlight illumination intensity on the surface, the vehicle can determine how to move the headlight with the positioner to align the headlight. If desired, information on the three-dimensional shape of a surface in front of the vehicle may be obtained from a database. For example, a three-dimensional map of the environment may be stored in a navigation database. Information from satellite navigation system sensors and/or other navigation sensors may be used to determine vehicle location. The known vehicle location may then be used to retrieve corresponding three-dimensional surface shape information from the database.

DETAILED DESCRIPTION

A system such as a vehicle or other system may have components that emit light such as headlights and other lights. Headlights may be used to illuminate roadways and other objects in the vicinity of a vehicle. The illumination provided by the headlights allows vehicle occupants to view the objects at night or in other dim ambient lighting conditions and facilitates the operation of sensors. For example, headlight illumination at visible and/or infrared wavelengths may be used to provide illumination for image sensors that are used by an autonomous driving system or driver's assistance system.

The illumination that is emitted by the headlights in a vehicle may be adjustable. For example, the headlights may have adjustable components that allow the headlights to be operated in high-beam and low-beam modes and to be steered to the left and right (e.g., to accommodate curves in a road). If desired, headlight adjustments may be made to calibrate the headlights. In this way, unintended misalignment of the headlights over time may be prevented.

To help ensure that headlights are properly aligned and therefore emit light beams in desired directions, a vehicle sensor such as a three-dimensional sensor may gather information on an object within range of the headlights. For example, a lidar sensor may be used to map the three-dimensional shape of a roadway and an object on the roadway in front of a vehicle. An image sensor in the vehicle can measure the pattern of illumination from the headlights that falls on the roadway and object. Measurements of headlight illumination reveal the direction in which a headlight is pointing. By comparing the expected illumination (e.g., the expected headlight illumination direction) with the measured illumination (e.g., the measured headlight illumination direction), variations in headlight performance can be detected and corrective action taken. If, as an example, it is determined that the headlights are pointed 5° too high, a positioner coupled to the headlights may be directed to automatically tilt the headlights downward by 5° to compensate for this measured misalignment. In this way, the headlights may be continually adjusted during use of the vehicle to ensure that the headlights operate satisfactorily. The headlights may also be adjusted based on measured and predicated changes in vehicle orientation relative to a roadway and other measured and predicated conditions.

Figure 1:
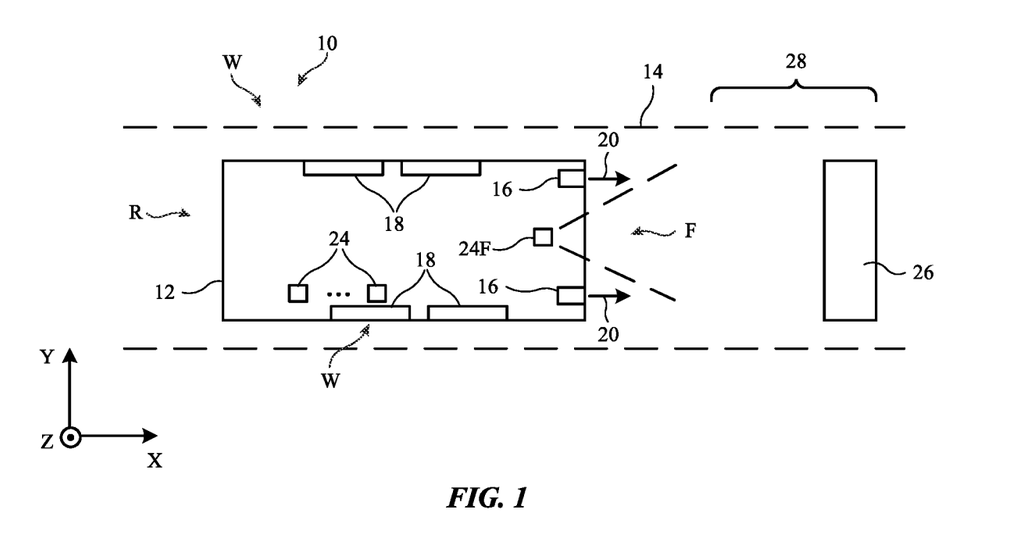
FIG. 1 is a top view of an illustrative vehicle in accordance with an embodiment.

FIG. 1 is a side view of a portion of an illustrative vehicle. In the example of FIG. 1, vehicle 10 is the type of vehicle that may carry passengers (e.g., an automobile, truck, or other automotive vehicle). Configurations in which vehicle 10 is a robot (e.g., an autonomous robot) or other vehicle that does not carry human passengers may also be used. Vehicles such as automobiles may sometimes be described herein as an example. As shown in FIG. 1, vehicle 10 may be operated on roads such as roadway 14. Objects such as object 26 may be located on or near other structures in the vicinity of vehicle 10 such as roadway 14.

Vehicle 10 may be manually driven (e.g., by a human driver), may be operated via remote control, and/or may be autonomously operated (e.g., by an autonomous driving system or other autonomous propulsion system). Using vehicle sensors such as lidar, radar, visible and/or infrared cameras (e.g., two-dimensional and/or three-dimensional cameras), proximity (distance) sensors, and/or other sensors, an autonomous driving system and/or driver-assistance system in vehicle 10 may perform automatic braking, steering, and/or other operations to help avoid pedestrians, inanimate objects, and/or other external structures such as illustrative obstacle 26 on roadway 14.

Vehicle 10 may include a body such as vehicle body 12. Body 12 may include vehicle structures such as body panels formed from metal and/or other materials, may include doors, a hood, a trunk, fenders, a chassis to which wheels are mounted, a roof, etc. Windows may be formed in doors 18 (e.g., on the sides of vehicle body 12, on the roof of vehicle 10, and/or in other portions of vehicle 10). Windows, doors 18, and other portions of body 12 may separate the interior of vehicle 10 from the exterior environment that is surrounding vehicle 10. Doors 18 may be opened and closed to allow people to enter and exit vehicle 10. Seats and other structures may be formed in the interior of vehicle body 12.

Vehicle 10 may have automotive lighting such as one or more headlights (sometimes referred to as headlamps), driving lights, fog lights, daytime running lights, turn signals, brake lights, and/or other lights. As shown in FIG. 1, for example, vehicle 10 may have lights such as lights 16. In general, lights 16 may be mounted on front F of vehicle 10, on rear R of vehicle 10, on left and/or right sides W of vehicle 10, and/or other portions of body 12. In an illustrative configuration, which may sometimes be described herein as an example, lights 16 are headlights and are mounted to front F of body 12. There may be, as an example, left and right headlights 16 located respectively on the left and right of vehicle 10 to provide illumination 20 in the forward direction (e.g., in the +X direction in which vehicle 10 moves when driven forward in the example of FIG. 1). By shining headlights 16 on external surfaces 28 such as roadway 14 and object 26 in front of vehicle 10, occupants of vehicle 10 may view surfaces 28 even in dim ambient lighting conditions (e.g., at night). The operation of sensors in vehicle 10 such as image sensors and other sensors that use light may also be supported by providing surfaces 28 with illumination.

Vehicle 10 may have components 24. Components 24 may include propulsion and steering systems (e.g., manually adjustable driving systems and/or autonomous driving systems having wheels coupled to body 12, steering controls, one or more motors for driving the wheels, etc.), and other vehicle systems. Components 24 may include control circuitry and input-output devices. Control circuitry in components 24 may be configured to run an autonomous driving application, a navigation application (e.g., an application for displaying maps on a display), and software for controlling vehicle climate control devices, lighting, media playback, window movement, door operations, sensor operations, and/or other vehicle operations. For example, the control system may form part of an autonomous driving system that drives vehicle 10 on roadways such as roadway 14 autonomously using data such as sensor data. The control circuitry may include processing circuitry and storage and may be configured to perform operations in vehicle 10 using hardware (e.g., dedicated hardware or circuitry), firmware and/or software. Software code for performing operations in vehicle 10 and other data is stored on non-transitory computer readable storage media (e.g., tangible computer readable storage media) in the control circuitry. The software code may sometimes be referred to as software, data, program instructions, computer instructions, instructions, or code. The non-transitory computer readable storage media may include non-volatile memory such as non-volatile random-access memory, one or more hard drives (e.g., magnetic drives or solid state drives), one or more removable flash drives or other removable media, or other storage. Software stored on the non-transitory computer readable storage media may be executed on the processing circuitry of components 24. The processing circuitry may include application-specific integrated circuits with processing circuitry, one or more microprocessors, a central processing unit (CPU) or other processing circuitry.

The input-output devices of components 24 may include displays, sensors, buttons, light-emitting diodes and other light-emitting devices, haptic devices, speakers, and/or other devices for gathering environmental measurements, information on vehicle operations, and/or user input and for providing output. The sensors in components 24 may include ambient light sensors, touch sensors, force sensors, proximity sensors, optical sensors such as cameras operating at visible, infrared, and/or ultraviolet wavelengths (e.g., fisheye cameras, two-dimensional cameras, three-dimensional cameras, and/or other cameras), capacitive sensors, resistive sensors, ultrasonic sensors (e.g., ultrasonic distance sensors), microphones, radio-frequency sensors such as radar sensors, lidar (light detection and ranging) sensors, door open/close sensors, seat pressure sensors and other vehicle occupant sensors, window sensors, position sensors for monitoring location, orientation, and movement, speedometers, satellite positioning system sensors, and/or other sensors. Output devices in components 24 may be used to provide vehicle occupants and others with haptic output, audio output, visual output (e.g., displayed content, light, etc.), and/or other suitable output.

Three-dimensional sensors in components 24 may be formed from pairs of two-dimensional image sensors operating together as a stereoscopic depth sensor (e.g., a binocular camera pair forming at three-dimensional camera). Three-dimensional sensors may also be formed using image sensor systems that emit structured light (e.g., arrays of dots, lines, grids, and/or other structured light patterns at infrared and/or visible wavelengths) and that capture images (e.g., two-dimensional images) for analysis. The captured images reveal how the structured light patterns have been distorted by the three-dimensional surfaces illuminated by the structured light patterns. By analyzing the distortion of the structured light, the three-dimensional shape of the surfaces can be reconstructed. If desired, three-dimensional sensors for vehicle 10 may include one or more time-of-flight sensors. For example, time-of-flight measurements may be made using light (e.g., lidar sensor measurements) and radio-frequency signals (e.g., three-dimensional radar).

During operation, the control circuitry of components 24 may gather information from sensors and/or other input-output devices such as lidar data, camera data (e.g., two-dimensional images), radar data, and/or other sensor data. For example, three-dimensional image data may be captured using three-dimensional image sensor(s). Two-dimensional images (e.g., images of headlight illumination on one or more external surfaces such as external surface(s) 28 of FIG. 1) may also be gathered.

A vehicle occupant or other user of vehicle 10 may provide user input to the control circuitry of vehicle 10. Cameras, touch sensors, physical controls, and other input devices may be used to gather the user input. Using wireless communications with vehicle 10, remote data sources may provide the control circuitry of components 24 with database information. Displays, speakers, and other output devices may be used to provide users with content such as interactive on-screen menu options and audio. A user may interact with this interactive content by supplying touch input to a touch sensor in a display and/or by providing user input with other input devices. If desired, the control circuitry of vehicle 10 may use sensor data, user input, information from remote databases, and/or other information in providing a driver with driver assistance information (e.g., information on nearby obstacles on a roadway and/or other environment surrounding vehicle 10) and/or in autonomously driving vehicle 10.

Components 24 may include forward-facing sensor circuitry, as shown by forward-facing sensor(s) 24F of FIG. 1. The forward-facing sensor circuitry may include one or more sensors facing a surface in front of vehicle 10 (e.g., one or more sensors that are directed in the +X direction of FIG. 1 to detect surfaces 28 of structures in front of vehicle 10 such as obstacle 26 and roadway 14). Sensors 24F and/or other sensors in vehicle 10 may include lidar, radar, visible and/or infrared cameras, and/or other sensors. For example, sensors 24F may include two-dimensional image sensors and/or three-dimensional image sensors operating using structured light, binocular vision, time-of-flight (e.g., lidar or radar), and/or other three-dimensional imaging arrangements. Sensors 24F may include a three-dimensional sensor that measures the three-dimensional shape of surface(s) 28 and that optionally measures the pattern of headlight illumination from headlights 16 on surface(s) 28. If desired, a two-dimensional image sensor may be used to measure the headlight illumination pattern on surface(s) 28 (e.g., the forward-facing sensor circuitry of vehicle 10 may use three-dimensional and two-dimensional sensors to respectively measure surface shapes and headlight illumination intensity or both of these sensors may be used in gathering information on surface shape and/or surface illumination).

To ensure that surfaces 28 are sufficiently well illuminated to be visible to a user in vehicle 10 and to be visible to visible-light image sensors in sensors 24F, headlights 16 may produce visible light illumination. To help ensure that optional infrared image sensors in forward-facing sensors 24F receive sufficient reflected infrared light from the illuminated structures in front of vehicle 10, headlights 16 may, if desired, produce infrared illumination. The forward-facing sensor circuitry of vehicle 10 that is used in measuring headlight illumination may be sensitive to visible light and, if desired, infrared light.

To correct for misalignment of headlights 16 over time (e.g., misalignment due to shifts in the mounting structures for headlights 16, changes in vehicle suspension components, etc.), the control circuitry of vehicle 10 may control positioners in headlights 16 dynamically based on sensor measurements (e.g., based on discrepancies between an expected pattern of headlight illumination and a measured pattern of illumination). If, as an example, headlights 16 are pointed too high, a positioner may be used to tilt headlights 16 downwards so that headlights 16 are aimed appropriately.

In this way, headlights 16 may be automatically compensated for misalignment and may remain aligned during operation of vehicle 10.

Figure 2:
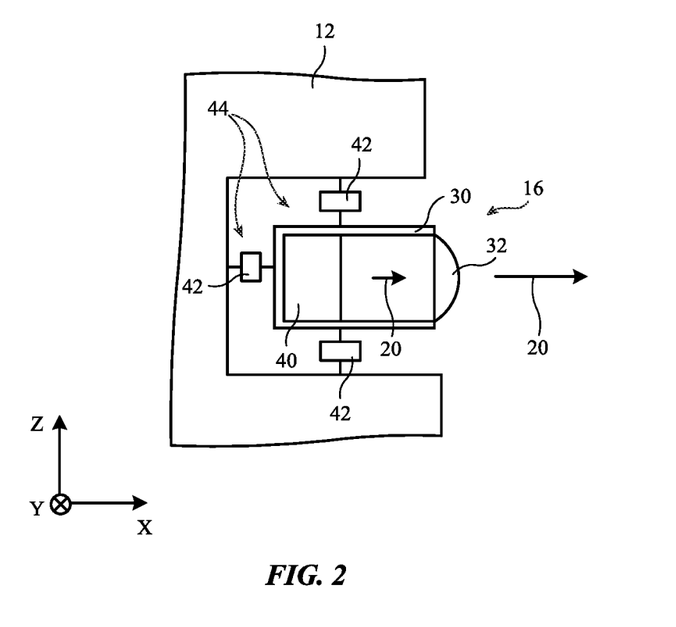
FIG. 2 is a side view of an illustrative adjustable headlight in accordance with an embodiment.

FIG. 2 is a cross-sectional side view of an illustrative headlight showing how the headlight may be mounted to body 12. Body 12 may have a cavity that receives headlight 16, headlight 16 may be attached to an outer surface of body 12, and/or headlight 16 may be otherwise supported by body 12. As shown in FIG. 2, headlight 16 may include headlight housing 30 and one or more lenses or other optical components such as headlight lens 32. Housing 30 may include support structures and enclosure structures for supporting the components of headlight 16. These structures may facilitate mounting of headlight 16 to body 12. Housing 30 may include polymer, metal, carbon-fiber composites and other fiber composites, glass, ceramic, other materials, and/or combinations of these materials. Lens 32 may include polymer, glass, transparent ceramic, and/or other materials that are transparent to visible light and infrared light (e.g., near infrared light). Headlight 16 includes a light source such as light source 40 that emits light 20. Light 20 may include visible light (e.g., light from 400 nm to 750 nm) and, if desired, may include infrared light (e.g., near infrared light at one or more wavelengths from 800 to 2500 nm or other suitable infrared light). Lens 32 may be formed from one or more lens elements and may be used to help collimate light 20 and direct light 20 from headlight 16 in desired directions (e.g., to produce a beam of illumination in the +X direction).

Light source 40 may include one or more light-emitting devices such as light-emitting diodes, lasers, lamps, or other components that emit light. Optical elements such as reflectors, lenses, diffusers, colored elements, filters, adjustable shutters for adjusting the output of headlight 16 between low-beam and high-beam illumination patterns, and/or other optical components may be included in headlamp 16 (e.g., such optical elements may be included in housing 30). Independently adjustable light-emitting diodes and electrically adjustable components such as adjustable shutters and/or other adjustable optical components associated with headlight 16 may be adjusted by the control circuitry of vehicle 10 to adjust the direction of light 20 and the shape of the area covered by light 20 (e.g., to adjust light 20 to produce a desired low-beam or high-beam illumination pattern and/or other illumination pattern(s), to steer light 20, etc.).

A positioner such as positioner 44 may be used to adjust the position and therefore the angular orientation of headlight 16 relative to body 12. Positioner 44 may include one or more electrically adjustable actuators such as actuators 42 and may include optional manually adjusted positioning components (e.g., threaded members that can be rotated with a manual or motorized screwdriver to adjust the position of headlight 16). Actuators 42 may include one or more motors, solenoids, and/or other actuators. In response to commands from the control circuitry of vehicle 10, the positioner formed from actuator(s) 42 may be used to translate headlight 16 along the X, Y, and/or Z axes and/or other axes and/or may be used to rotate headlight 16 about the X, Y, and/or Z axes and/or other axes. As one example, actuators 42 may tilt headlight 16 up and down relative to the structures in front of vehicle 10 by rotating headlight 16 about the Y axis of FIG. 2 and may rotate headlight 16 to the left and right about the Z axis of FIG. 2. If desired, the positioner for headlight 16 may be used to make different types of position adjustments (e.g., rotations about the X axis, translation and/or rotation relative to another axis, etc.). The use of a positioner such as positioner 44 of FIG. 2 that is formed from one or more actuators 42 in vehicle 10 to tilt headlight 16 up/down and to rotate headlight 16 right/left is illustrative.

During operation, vehicle 10 may adjust headlights 16 to accommodate different driving conditions. One or more adjustable shutters, adjustable light-emitting devices, and/or other adjustable components in headlights 16 may be controlled by the control circuitry of vehicle 10. If desired, high-beams or low-beams may be selected based on user input and/or based on oncoming traffic detected using one or more sensors. As another example, when it is determined (from a steering system sensor, location sensor, lidar sensor, etc.) that the roadway on which vehicle 10 is traveling is starting to curve to the left, headlights 16 can automatically be turned to the left by the positioner to ensure that the roadway is satisfactorily illuminated by light 20. Headlights 16 may also be turned on and off and/or otherwise adjusted based on measured ambient lighting conditions, weather, and other factors.

Adjustments to the position of headlights 16 may also be made for calibration purposes. For example, to avoid risk that headlights 16 might become misaligned over time, vehicle 10 may monitor the alignment of headlights 16. Vehicle 10 may, as an example, use forward-facing sensor circuitry to map the structures in front of vehicle 10 and to measure the pattern of illumination on these structures. From these measurements, the control circuitry of vehicle 10 may determine which (if any) corrective actions are to be taken. For example, vehicle 10 may determine how headlights 16 should be repositioned by positioner 44 to correct for detected changes in headlight alignment.

Figure 3:
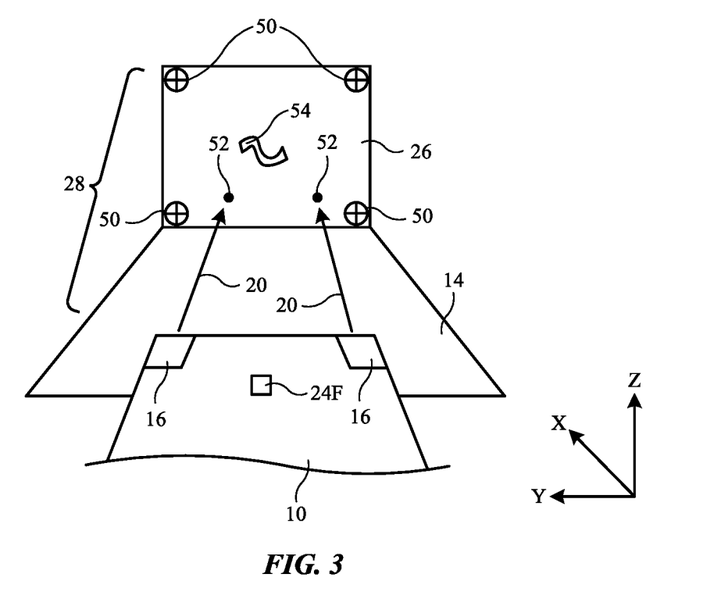
FIG. 3 is a perspective view of an illustrative scene with a target being illuminated by headlights in accordance with an embodiment.

To map the structures in front of vehicle 10, vehicle 10 may use a three-dimensional sensor to gather a three-dimensional image of the structures. The three-dimensional sensor may be a lidar sensor, a radar sensor, a stereoscopic camera, a structured light sensor, or other three-dimensional image sensor that can gather three-dimensional images. Consider, as an example, the scenario of FIG. 3. In the example of FIG. 3, vehicle 10 is traveling on roadway 14 (e.g., a public road, a driveway, etc.). A three-dimensional sensor in forward-facing sensor(s) 24F is facing forward in the +X direction. Surfaces 28 are associated with the portion of roadway 14 in front of vehicle 10 and object 26 and are in the field of view of the three-dimensional sensor. The three-dimensional sensor may therefore capture a three-dimensional image of surfaces 28 to determine the shape (e.g., the location in three dimensions) of roadway 14 and the shape (e.g., the location in three-dimensions) of object 26. The captured shape information includes information on the distance between vehicle 10 and surfaces 28. Objects such as roadway 14 and object 26 may receive illumination from headlights 16 and may therefore sometimes be referred to as target objects or a target.

Object 26 of surfaces 28 may be a test target that has a predetermined set of registration marks 50 (sometimes referred to as fiducials, optical targets, or alignment marks) or may be any other object (e.g., an everyday object such as a wall, garage door, vehicle, or other structure). As an example, object 26 may be an external object that contains detectable surface markings 54 (e.g., visually apparent markings or other characteristics that allow the three-dimensional sensor to sense the shape and appearance surfaces 28). The presence of marks 50 and/or other markings 54 may assist vehicle 10 in accurately measuring the location surfaces 28. For example, alignment marks 50 may be separated by known distances from each other, so analysis of an image that contains marks 50 may help determine the distance of object 26 to vehicle 10 and may help determine the angular orientation of object 26 relative to vehicle 10. In three-dimensional sensors based on stereoscopic image sensors, the presence of marks 50 and/or markings 54 may help in the construction of three-dimensional images from stereoscopic pairs of two-dimensional images. If desired, sensor data from multiple sources in the forward-facing sensor circuitry of vehicle 10 may be combined to further enhance three-dimensional surface shape measurements. As an example, three-dimensional image data from a lidar sensor may be combined with three-dimensional data from a stereoscopic camera, three-dimensional radar data, and data from a two-dimensional sensor.

Based on the three-dimensional image of surfaces 28 that is captured using the three-dimensional image sensor, vehicle 10 can determine the expected projection of headlight beams (illumination 20) from headlights 16 onto surfaces 28. A two-dimensional image sensor or other sensor(s) in sensor(s) 24F may measure the actual pattern of illumination 20 projected onto surfaces 28, so that the actual and expected projection patterns can be compared to identify discrepancies.

Consider, as an example, a scenario in which object 26 is a planar surface that is 10 meters in front of vehicle 10 and that is orientated perpendicular to vehicle 10. Using the three-dimensional image of surfaces 28, vehicle 10 can determine the location and orientation of object 26 (e.g., 10 m in front of vehicle 10) and can determine the tilt and/or other characteristics of roadway 14. The three-dimensional image of roadway 14 may reveal, as an example, that roadway 14 is flat and horizontal. Based on the known shape of surfaces 28 (e.g., the known position of the surface of object 26 relative to vehicle 10 and roadway 14), vehicle 10 (e.g., the control circuitry of components 24) may determine the position of headlights 16 relative to surfaces 28 and thereby predict the locations on surfaces 28 of left and right headlight illumination center points 52 on object 26 that are to be produced by left and right headlights 16 in vehicle 10, respectively. If desired, headlight operation may be characterized by making other headlight illumination intensity measurements (e.g., measurements that identify the edges of a headlight beam, or other headlight illumination measurements that determine the direction of the headlight illumination).

Due to vibrations and normal aging in the mounting components for headlights 16 and/or other variations in vehicle 10 over time, there may be a tendency for headlights 16 to move out of perfect alignment. As an example, in the absence of intervention, the left and right headlights of vehicle 10 might slowly begin to aim higher than nominal. Knowing the distance of object 26 from headlights 16 and the nominal (correct) orientation of headlights 16, vehicle 10 can predict the correct location of headlight aiming points 52. By capturing an image of the projected output of headlights 16, the actual orientation of headlights 16 (e.g., the actual direction in which headlights 16 are pointed) can be measured and compared with the expected orientation of headlights 16 when perfectly aligned (e.g., the expected direction in which headlights 16 should be pointed). For example, an image sensor in vehicle 10 may capture an image of surfaces 28 while surfaces 28 are under illumination from headlights 16. The pattern of light 20 projected onto surfaces 28 (e.g., object 26 and roadway 14) may reveal that headlights 16 are pointed 10 cm higher on the surface of object 26 than expected (e.g., points 52 may be 10 cm too high, in this example). Because the shape of surfaces 28 is known and the distance from headlights 16 to the surface of object 26 is known, vehicle 10 can determine from the measured 10 cm vertical offset of points 52 that headlights 16 are pointed 2° too high (as an example). Based on this determination, positioner 44 can be directed to tilt headlights 16 downwards by 2° to compensate for the measured 2° of angular misalignment. This aligns headlights 16 so that they point were expected and so that points 52 on object 26 coincide with their expected positions. In this way, the overall pattern of illumination produced when light 20 strikes surfaces 28 will be as desired.

In monitoring headlight performance, vehicle 10 may measure the peak intensity of headlight illumination 20, may measure the edges of illumination 20 (e.g., the boundary of the illumination pattern), and/or may measure other headlight performance parameters to characterize the output of headlights 16. One or more of these measured headlight performance parameters may then be compared to corresponding predicted headlight performance parameters.

Figure 4:
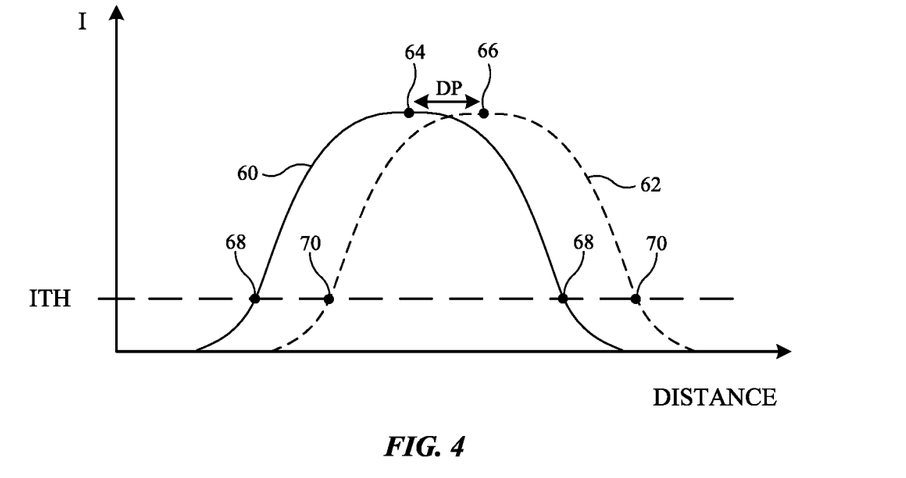
FIG. 4 is a graph showing how headlight performance can be monitored by measuring headlight illumination intensity as a function of position across an illuminated surface in accordance with an embodiment.

Consider, as an example, the headlight output shown in the graph of FIG. 4. In the example of FIG. 4, headlight output intensity I has been plotted as a function of DISTANCE (e.g., distance across surfaces 28 parallel to the X axis or Y axis of FIG. 3). Solid line 60 corresponds to the expected output of headlight 16 when headlight 16 is properly aligned (e.g., a prediction based on the measured shape of surfaces 28 and the known nominal operating characteristics of headlights 16 when aligned). Dashed line 62 corresponds to the measured output of headlight 16 (e.g., the output measured by capturing an image of surfaces 28 while illuminated by light 20). To determine how much measured performance varies from expected performance, vehicle 10 may determine the location of the peak in intensity I for each curve, may determine the locations of the edges of each curve, and/or may otherwise measure the intensity and position of the light output from headlights 16.

As shown in FIG. 4, for example, expected intensity curve 60 has an expected intensity peak 64, whereas measured curve 62 has a measured intensity peak 66 that is shifted by a distance DP with respect to peak 64. Vehicle 10 may compare points 64 and 66 to determine the value of DP and/or vehicle 10 may gather information on the expected and measured intensity patterns for headlights by comparing edge intensities (see, e.g., points 68, which correspond to the positions of the edges of the headlight illumination pattern where expected intensity 60 has fallen to intensity threshold ITH and points 70 which correspond to the measured positions of these edges where measured intensity 62 has intensity threshold ITH). Using illumination pattern edges, peaks, and/or other illumination pattern characteristics, predicated and measured headlight information (e.g., curves 60 and 62) can be compared by vehicle 10 to determine the amount by which positioner 44 should be adjusted to align headlights 16. Headlights 16 may be aligned collectively (e.g., measurements may take place while left and right headlights are illuminated) or may be aligned individually (e.g., by making a first measurement while the left headlight is illuminated but not the right headlight and by making a second measurement while the right headlight is illuminated but not the left).

Figure 5:
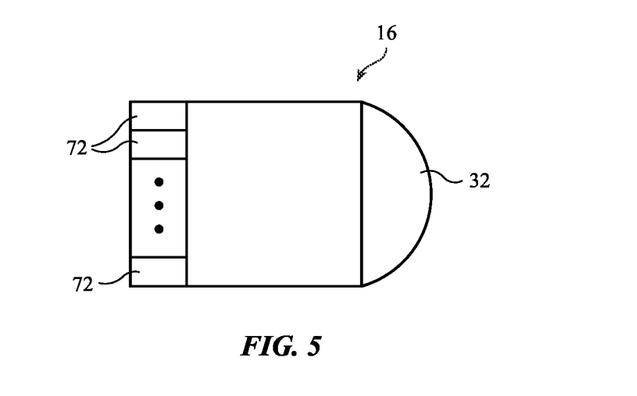
FIG. 5 is a cross-sectional side view of an illustrative headlight with multiple independently adjustable elements in accordance with an embodiment.

If desired, headlights 16 may contain multiple individually adjustable headlight elements. As shown in FIG. 5, for example, headlight 16 may have multiple headlight elements 72, each of which is individually adjustable. Elements 72 may have independently adjustable light sources (e.g., each element 72 may correspond to a separate light-emitting diode) and/or elements 72 may have independently adjustable shutters or other light-adjusting devices. To enhance the accuracy of headlight output characterization measurements, one or more of elements 72 may be used to produce illumination while remaining elements 72 do not produce illumination. By cycling through each element 72 (or set of elements), different corresponding output intensity measurements corresponding to each element 72 (or set of elements) may be obtained. Consider, as an example, a scenario in which there are three separate light-emitting diodes in headlight 16 (e.g., elements 72 correspond to individually adjustable light sources). To determine whether headlight 16 needs to be aligned, each of the three light-emitting diodes may be turned on in sequence while corresponding images of surfaces 28 under the resulting illumination are captured. In this way, more detailed headlight illumination measurements may be made than if all elements 72 were turned on at the same time.

Figure 6:
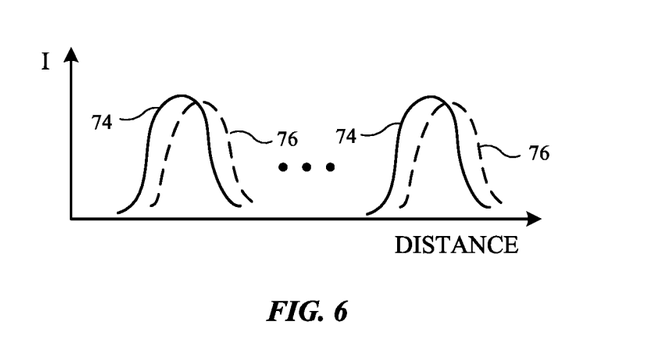
FIG. 6 is a graph showing how measurements may be made on illumination from the headlight of FIG. 5 in accordance with an embodiment.

FIG. 6 shows how this type of approach may produce multiple partially activated headlight output curves, each of which corresponding to activation of a separate respective element 72. For each element 72, vehicle 10 may produce a corresponding expected output curve 74 and may measure a corresponding actual output intensity (curve 76). By gathering headlight performance data using more granular measurements such as these, headlight performance can be gauged more accurately then when all elements 72 are activated together. Following characterization of each separate element 72 (e.g., by measuring how much expected curves 74 are shifted relative to measured curves 76) any headlight misalignment may be accurately determined. Positioner 44 may then be used to move headlight 16 (e.g., to adjust the angular orientation of headlight 16) and/or the relative intensities of each element 72 may be adjusted to align headlights 16 and to help ensure that headlights 16 provide illumination in a desired pattern.

Vehicle 10 may make measurements on surfaces 28 and the projected headlight illumination on surfaces 28 when parked next to a calibration target (e.g., a screen or other object with registration marks 50), when parked next to a wall, garage door, or other structure, or during normal operation traveling on a road (e.g., when vehicle 10 is being driven autonomously or manually through traffic).

Figure 7:
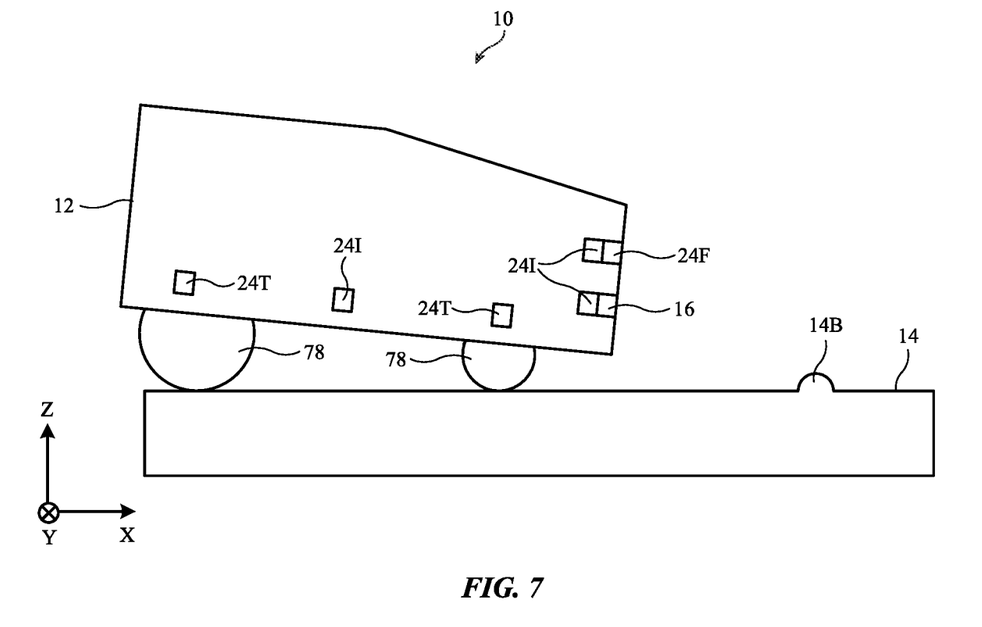
FIG. 7 is a cross-sectional side view of an illustrative vehicle with headlights and sensor circuitry in accordance with an embodiment.

Depending on the operating conditions for vehicle 10, vehicle 10 may tilt or otherwise changes its orientation relative to roadway 14. As shown in FIG. 7, for example, vehicle 10 may tilt forward when decelerating. This tilt may be detected by a three-dimensional sensor in forward-facing sensors 24F and, if desired, may be detected using sensors such as sensors 24T (e.g., suspension displacement sensors that sense how much wheels 78 are protruding from vehicle body 12 to determine the orientation of vehicle body 12 relative to roadway 14). By measuring the orientation of vehicle 10 relative to roadway 14, the expected location of the headlight illumination on surfaces 28 may be determined. If, for example, it is determined that vehicle 10 is tilting downwards, the expected location of points 52 of FIG. 3 will be lower than if it is determined that vehicle 10 is tilting upwards. Accordingly, sensor information such as vehicle suspension sensor information and/or other tilt sensor information may be taken into account when predicting the location of headlight output on a target.

If desired, positioner 44 may be controlled, one or more light sources and/or light modulating components may be controlled (see, e.g., elements 72 of FIG. 5), and/or other adjustable components associated with headlights 16 may be controlled to adjust illumination 20 (e.g., while vehicle 10 is being driven). These adjustments may be made based on sensor measurements that reveal vehicle tilt, road characteristics such as the presence or predicted presence of speed bumps in roadway 14 (see, e.g., bump 14B), weather (e.g., whether rain or other precipitation is present or is not present), ambient lighting conditions, predicated or detected turns in roadway 14, geographic vehicle location, and/or other conditions of vehicle 10 when parked, when being driven, etc. If desired, vehicle 10 may have sensors such a sensors 24I. Sensors 24I may be, for example, inertial measurement units containing compasses, accelerometers, and/or gyroscopes and may be used to measure the orientation of vehicle body 12, forward-facing sensors 24F, and/or headlights 16 with respect to gravity.

Consider, as an example, a scenario in which the control circuitry of vehicle 10 uses a sensor or other data source to determine that vehicle 10 is starting to turn to the left along roadway 14. Vehicle 10 may obtain information on the left turn in roadway 14 from a map database or other external databased, from lidar measurements or other forward-facing sensor measurements, from inertial measurement unit measurements, from steering system components (e.g., steering position sensors), and/or from other sources. In response to detecting that a left-hand bend is present or is upcoming, vehicle 10 may use positioner 44 to turn headlights 16 to the left. This helps ensure that illumination 20 will be present on roadway 14. As another example, if an upcoming bump such as bump 14B is detected, vehicle 10 can automatically adjust the position of headlight 16 as vehicle 10 travels over bump 14B to help maintain a desired direction for headlight illumination 20 (e.g., to help ensure that headlight illumination 20 is directed straight forward, even as vehicle 10 tilts due to movement of wheels 78 over bump 14B. If desired, headlights 16 may support low-beam and high-beam modes. Vehicle 10 may switch between these modes based on sensor data from sensors in vehicle 10 such as rain sensors (e.g., moisture sensors), ambient light sensors, oncoming headlight sensors, traffic sensors, and/or other sensors. Headlight movements such as movements to accommodate bends in a road may be taken into account during automatic alignment operations. For example, if headlights 16 have been turned to the left due to the presence of a left turn in roadway 14, vehicle 10 will expect that headlight illumination 20 will likewise be moved to the left on surfaces 28 and can therefore take this information into account when measuring headlight output to assess headlight alignment.

Figure 8:
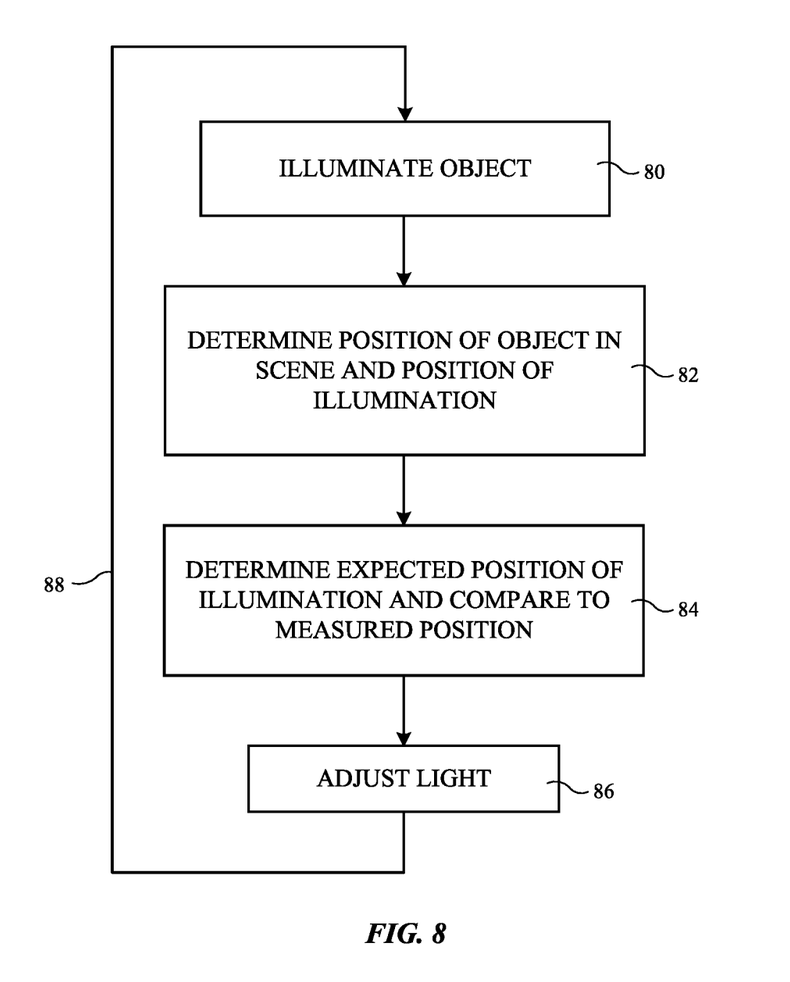
FIG. 8 is a flow chart of illustrative operations involved in using a vehicle with headlights in accordance with an embodiment.

Illustrative operations involved in using vehicle 10 are shown in FIG. 8.

During the operations of block 80, headlights 16 may be used to illuminate object 26, roadway 14 (e.g., surfaces 28 of FIG. 3). Left and right headlights 16 may be illuminated simultaneously or separately. In headlight configurations in which each headlight has multiple adjustable elements such as elements 72 of FIG. 5, these elements may, if desired, be individually adjusted during the operations of block 80 (e.g., to provide information during headlight characterization on the individual contributions of these elements to different portions of the headlight illumination supplied by headlights 16).

During the operations of block 82, a three-dimensional sensor in forward-facing sensors 24F may be used to capture images of surfaces 28 (e.g., three-dimensional images may be captured). The presence of registration marks 50 on a target surface such as the surface of object 26 and/or other detectable features such as markings 54 may facilitate the capturing of satisfactory three-dimensional image data from a target. In addition to obtaining a three-dimensional map (shape) for surfaces 28, vehicle 10 may capture an image of the headlight illumination from headlight(s) 16 that is present on surfaces 28. For example, a visible light image and/or an infrared image from a three-dimensional image sensor, a separate two-dimensional image sensor, or other sensor may be captured that shows the location of the peak intensity of headlight illumination and/or that shows other headlight illumination features (e.g., the locations of the edges of the headlight illumination pattern).

If desired, information on the three-dimensional shapes of surfaces in front of the vehicle may be obtained from a local (in-vehicle) and/or remote navigation system database in addition to or instead of obtaining three-dimensional shape information. For example, a three-dimensional map of the environment may be stored in a navigation database for use in driving assistance functions and/or autonomous driving functions. Information from navigation system sensors (e.g., Global Positioning System circuitry and/or other satellite navigation system circuitry, inertial measurement units, lidar, image recognition systems, and/or other navigation sensors) may be used to determine vehicle location (position and orientation). The vehicle location information that is obtained from the navigation system sensors in this way may be used to retrieve corresponding three-dimensional surface shape information from the database (e.g., the three-dimensional shapes of surfaces at the determined vehicle location.

After measuring the shape of surfaces 28 and/or otherwise determining the shape of surfaces 28 (e.g., by obtaining information from a database) and measuring the pattern of headlight illumination 20 that is illuminating surfaces 28, vehicle 10 may, during the operations of block 84, determine the expected pattern of the headlight illumination on surfaces 28 (e.g., the expected peak intensity position of headlight output, the expected location of headlight beam edges, and other characteristics associated with the direction in which the headlight illumination is expected to be pointing). The expected headlight illumination pattern is determined based on the known shape of surfaces 28 (e.g., the location in three dimensions of surfaces 28 relative to vehicle 10), and the known nominal performance characteristics of headlights 16 (e.g., the known size and shape of the beam of light emitted by each headlight. During block 84, vehicle 10 measures the actual headlight illumination pattern produced on surfaces 28 by headlights 16 and compares the measured headlight illumination information to the expected headlight illumination information.

If the expected and measured illumination patterns (center position, edge position, etc.) do not match, corrective action may be taken based on the results of the comparison to align headlights 16. For example, during the operations of block 86, the control circuitry of vehicle 10 may direct positioner 44 to tilt headlight 16 downwards by 3° in response to detection of an undesired 3° upward tilt. As shown by line 88, the automatic alignment operations of FIG. 8 may be performed repeatedly (e.g., whenever vehicle 10 is parked, periodically according to a schedule, whenever satisfactory surfaces 28 are available in front of vehicle 10, in response to a user input command, and/or in response to determining that other headlight calibration criteria have been satisfied).

Although sometimes described in the context of headlights, any suitable lights in vehicle 10 may be aligned using the approach of FIG. 8 (e.g., fog lights, tail lights, parking lights, supplemental side lighting, etc.). In addition to performing headlight alignment operations, the control circuitry of vehicle 10 may, if desired, use sensor measurements to calibrate actuators such as positioner 44. As an example, when vehicle 10 is parked, positioner 44 may be calibrated by directing positioner 44 to move while making corresponding sensor measurements to evaluate the accuracy of these movements. Examples of sensors that may be used in gauging actuator performance so that compensating calibration operations may be performed include light sensors (e.g., an image sensor that measures whether light output from headlight 16 moves by 4.5° when positioner 44 is directed to move by 4.5°) and inertial measurement units (e.g., an inertial measurement unit coupled to positioner 44 that measures the angular movement of positioner 44 during calibration). Calibrating positioner 44 while vehicle 10 is stationary (parked), enables vehicle 10 to more accurately perform open loop control of the aim of positioner 44 when driving based on navigation system information (inertial measurement unit data and satellite navigation system data) and other data.

The foregoing is merely illustrative and various modifications can be made to the described embodiments. The foregoing embodiments may be implemented individually or in any combination.

What is claimed is:

1. A vehicle, comprising:
    a vehicle body;
    a headlight supported by the vehicle body that is configured to produce headlight illumination;
    control circuitry configured to detect a difference between an expected direction of the headlight illumination and a measured direction of the headlight illumination;
    an electrically adjustable positioner; and
    a sensor configured to detect tilt of the vehicle body relative to a roadway, wherein the expected direction of the headlight illumination is based on the detected tilt and wherein the electrically adjustable positioner is configured to align the headlight in response to the detected difference between the expected direction of the headlight illumination and the measured direction of the headlight illumination when the control circuitry adjusts the electrically adjustable positioner in response to the detected tilt.

2. The vehicle defined in claim 1 further comprising:
    forward-facing sensor circuitry on the vehicle body that is configured to capture a three-dimensional image of a surface in front of the vehicle body and that is configured to measure the headlight illumination from the headlight as the headlight illuminates the surface, wherein the control circuitry is configured to use the three-dimensional image and the measured headlight illumination on the surface in determining the expected direction of the headlight illumination.

3. The vehicle defined in claim 2 wherein the forward-facing sensor circuitry comprises a two-dimensional image sensor configured to measure the headlight illumination.

4. The vehicle defined in claim 2 wherein the forward-facing sensor circuitry comprises a lidar sensor that captures the three-dimensional image.

5. The vehicle defined in claim 2 wherein the forward-facing sensor circuitry comprises a three-dimensional sensor configured to capture the three-dimensional image and wherein the three-dimensional sensor comprises a three-dimensional sensor selected from the group consisting of: a radar sensor, a stereoscopic camera, and a structured light sensor.

6. The vehicle defined in claim 1 further comprising an additional sensor configured to measure the headlight illumination while the control circuitry adjusts the headlight to change the headlight illumination.

7. The vehicle defined in claim 6 wherein the headlight comprises multiple light sources and wherein the additional sensor is configured to measure the headlight illumination while the control circuitry adjusts the multiple light sources to produce different respective amounts of light.

8. The vehicle defined in claim 6 wherein the headlight is operable in a low-beam mode and a high-beam mode and wherein the additional sensor is configured to measure the headlight illumination while the control circuitry changes the headlight between operation in the low-beam mode and operation in the high-beam mode.

9. The vehicle defined in claim 1 wherein the control circuitry is configured to adjust the electrically adjustable positioner based on information, wherein the information comprises information selected from the group consisting of: weather information, vehicle location information, and roadway information.

10. The vehicle defined in claim 1 further comprising:
    navigation system circuitry configured to determine a vehicle location, wherein the control circuitry is configured to use the determined vehicle location to retrieve a three-dimensional surface shape from a database corresponding to a surface in front of the vehicle body; and
    an image sensor configured to measure the headlight illumination from the headlight as the headlight illuminates the surface, wherein the control circuitry is configured to use the three-dimensional surface shape and the measured headlight illumination on the surface in determining the expected direction of the headlight illumination.

11. The vehicle defined in claim 1 wherein the control circuitry is further configured to calibrate the electrically adjustable positioner while the vehicle body is parked.

12. A vehicle, comprising:
    a vehicle body;
    a headlight that includes independently adjustable light sources and that is configured to produce headlight illumination on a surface in front of the vehicle body by activating different subsets of the independent adjustable light sources in sequence;
    sensor circuitry configured to obtain a surface measurement on the surface and configured to obtain partially activated headlight illumination measurements of the headlight illumination on the surface, each of the partially activated headlight illumination measurements corresponding to the activation of a given subset of the different subsets of the independently adjustable light sources;
    an electrically adjustable positioner configured to move the headlight relative to the vehicle body; and
    control circuitry configured to adjust the electrically adjustable positioner to align the headlight, wherein the control circuitry is configured to adjust, when aligning the headlight, relative output intensities of the independently adjustable light sources based on the partially activated headlight illumination measurements.

13. The vehicle defined in claim 12 wherein the sensor circuitry comprises a three-dimensional sensor and wherein the surface measurement comprises a three-dimensional surface shape gathered by the three-dimensional sensor.

14. The vehicle defined in claim 13 wherein the three-dimensional sensor comprises a lidar sensor.

15. The vehicle defined in claim 13 wherein the three-dimensional sensor comprises a stereoscopic sensor having a pair of cameras.

16. The vehicle defined in claim 13 wherein the three-dimensional sensor comprises an optical sensor.

17. The vehicle defined in claim 13 wherein the three-dimensional sensor comprises a radar sensor.

18. The vehicle defined in claim 13 wherein the control circuitry is configured to determine expected output intensities of the different subsets of the independently adjustable light sources and is configured to compare the expected output intensities to the partially activated headlight illumination measurements.

19. The vehicle defined in claim 18 wherein the control circuitry is configured to adjust the relative output intensities of the independently adjustable light sources based on the comparison of the expected output intensities to the partially activated headlight illumination measurements.

20. A vehicle, comprising:
a vehicle body;
a headlight;
a positioner configured to move the headlight relative to the vehicle body;
a three-dimensional sensor configured to measure a surface of an object in front of the vehicle body;
an image sensor configured to measure a position on the surface where the headlight is pointed; and
control circuitry configured to:
calibrate the positioner when the vehicle is parked by directing the positioner to move while making sensor measurements to evaluate accuracy of the movement;
use the measured surface to determine a predicated position on the object where the headlight is expected to be aimed when the headlight is aligned relative to the vehicle body;
compare the measured position to the predicated position; and
use the positioner to move the headlight based on the comparison.

21. The vehicle defined in claim 20 wherein the surface has a shape, wherein the surface is located at a distance from the vehicle body, and wherein the three-dimensional sensor is configured to measure the shape of the surface in three dimensions and the distance of the surface from the vehicle body.

22. The vehicle defined in claim 21 wherein the control circuitry is configured to use the calibrated positioner to move the headlight based on the comparison when the vehicle is traveling on a roadway.

* * * * *